(12) United States Patent
Ishikawa et al.

(10) Patent No.: US 10,511,565 B2
(45) Date of Patent: Dec. 17, 2019

(54) COMMUNICATION APPARATUS, DNS PROCESSING METHOD, AND NON-TRANSITORY COMPUTER-READABLE RECORDING MEDIUM

(71) Applicant: KYOCERA Corporation, Kyoto (JP)

(72) Inventors: Shuji Ishikawa, Yokohama (JP); Yasuhiro Ito, Tokyo (JP); Tomoya Kamijo, Yokohama (JP); Hidetaka Hayashi, Yokohama (JP); Kohei Michigami, Yokohama (JP); Kazuo Onishi, Yokohama (JP); Kazuya Chito, Machida (JP)

(73) Assignee: KYOCERA Corporation, Kyoto (JP)

( * ) Notice: Subject to any disclaimer, the term of this patent is extended or adjusted under 35 U.S.C. 154(b) by 240 days.

(21) Appl. No.: 15/423,693

(22) Filed: Feb. 3, 2017

(65) Prior Publication Data

US 2017/0230328 A1 Aug. 10, 2017

(30) Foreign Application Priority Data

Feb. 4, 2016 (JP) ................................ 2016-019930

(51) Int. Cl.
*G06F 15/16* (2006.01)
*H04L 29/12* (2006.01)
*H04L 29/08* (2006.01)

(52) U.S. Cl.
CPC ........ *H04L 61/1511* (2013.01); *H04L 67/141* (2013.01)

(58) Field of Classification Search
CPC ... H04L 61/1511; H04L 67/125; H04L 67/141
See application file for complete search history.

(56) References Cited

U.S. PATENT DOCUMENTS

| 5,987,611 | A | 11/1999 | Freund | |
|---|---|---|---|---|
| 9,479,572 | B1* | 10/2016 | Subramanian | ........ H04L 41/046 |
| 10,091,165 | B2* | 10/2018 | Gluck | ................. H04L 63/0227 |
| 2013/0029708 | A1* | 1/2013 | Fox | ........................ H04W 28/08 |
| | | | | 455/509 |
| 2013/0097329 | A1* | 4/2013 | Alex | .................... H04L 61/1511 |
| | | | | 709/228 |
| 2014/0130118 | A1* | 5/2014 | Maturi | ................... H04L 67/104 |
| | | | | 726/1 |

(Continued)

FOREIGN PATENT DOCUMENTS

| JP | 2012-029261 A | 2/2012 |
|---|---|---|
| JP | 2014-022986 A | 2/2014 |

(Continued)

OTHER PUBLICATIONS

Naoki Nozawa, iPad mini Perfect Manual iOS 7, Sotechsha Co., Ltd., (12/1002013), 1, 5 pp.

(Continued)

*Primary Examiner* — Jonathan A Bui
(74) *Attorney, Agent, or Firm* — Studebaker & Brackett PC

(57) ABSTRACT

A communication apparatus capable of data communication includes a controller that, upon acquiring a connection request from an application to connect to a network, controls DNS processing based on the connection request in accordance with the ID of the application issuing the connection request.

4 Claims, 9 Drawing Sheets

(56) References Cited

U.S. PATENT DOCUMENTS

| | | | | |
|---|---|---|---|---|
| 2014/0380455 A1* | 12/2014 | Kelly | ................... | H04L 63/029 |
| | | | | 726/11 |
| 2015/0181403 A1 | 6/2015 | Tanaka et al. | | |
| 2015/0327179 A1 | 11/2015 | Takahashi | | |
| 2016/0057793 A1* | 2/2016 | Wang | ................... | H04W 76/14 |
| | | | | 370/329 |
| 2019/0173924 A1* | 6/2019 | Lau | ................... | H04L 65/1006 |

FOREIGN PATENT DOCUMENTS

| | | |
|---|---|---|
| JP | 2014-36410 A | 2/2014 |
| JP | 2014-165275 A | 9/2014 |
| JP | 2015-162701 A | 9/2015 |

OTHER PUBLICATIONS

JP Office Action dated Dec. 12, 2017, from corresponding JP Appl No. 2016-204384, with English statement of relevance, 5 pp.

An Office Action; "Notice of Reasons for Rejection," issued by the Japanese Patent Office dated Jul. 5, 2016, which corresponds to Japanese Patent Application No. 2016-019930 and is related to the present application; with English language Concise Explanation.

An Office Action; "Notice of Reasons for Rejection," issued by the Japanese Patent Office dated Aug. 15, 2017, which corresponds to Japanese Patent Application No. 2016-204384 and is related to U.S. Appl. No. 15/423,693; with English language Concise Explanation.

\* cited by examiner

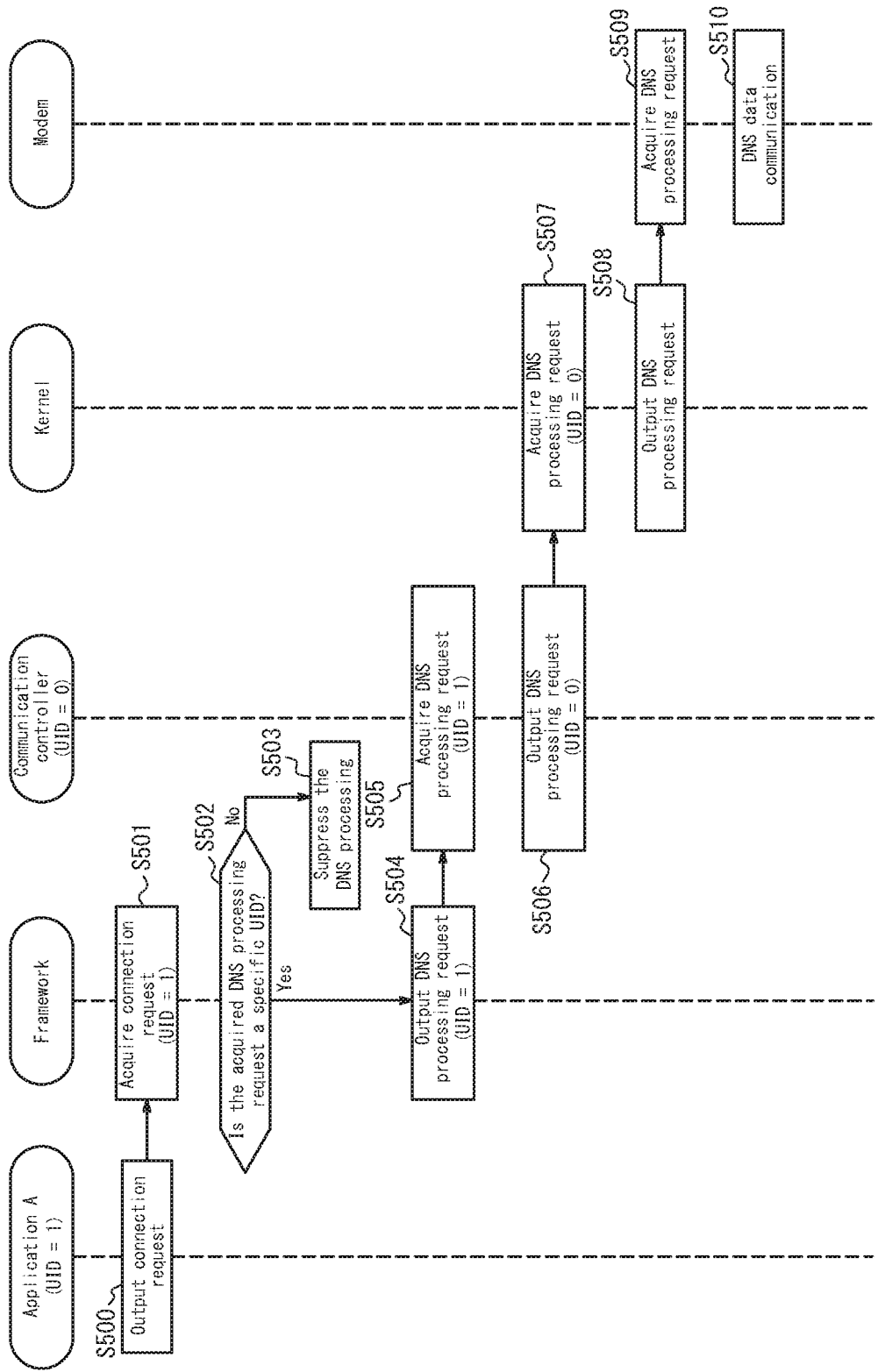

COMMUNICATION APPARATUS, DNS PROCESSING METHOD, AND NON-TRANSITORY COMPUTER-READABLE RECORDING MEDIUM

CROSS-REFERENCE TO RELATED APPLICATIONS

This application claims priority to and the benefit of Japanese Patent Application No. 2016-019930 filed on Feb. 4, 2016, the entire contents of which are incorporated herein by reference.

TECHNICAL FIELD

This disclosure relates to a communication apparatus, a DNS processing method, and a non-transitory computer-readable recording medium.

BACKGROUND

Communication apparatuses such as mobile terminals that can perform data communication have been proposed (for example, see JP 2015-162701 A (PTL 1)).

SUMMARY

A communication apparatus according to one of the embodiments of this disclosure is capable of data communication and includes:

a controller configured to, upon acquiring a connection request from an application to connect to a network, control DNS processing based on the connection request in accordance with an ID of the application issuing the connection request.

A DNS processing method according to one of the embodiments of this disclosure is performed by a communication apparatus capable of data communication, the DNS processing method including:

acquiring a connection request from an application to connect to a network; and controlling DNS processing based on the connection request in accordance with an ID of the application issuing the connection request.

A non-transitory computer-readable recording medium according to one of the embodiments of this disclosure includes computer program instructions, which when executed by a communication apparatus capable of data communication, cause the communication apparatus to:

acquire a connection request from an application to connect to a network; and control DNS processing based on the connection request in accordance with an ID of the application issuing the connection request.

BRIEF DESCRIPTION OF THE DRAWINGS

In the accompanying drawings:

FIG. 9 illustrates the sequence of DNS processing according to Embodiment 3.

DETAILED DESCRIPTION

Many communication apparatuses are configured so that while data communication by applications running on the communication apparatus is permitted by default, data communication by applications selected by the user can be prohibited. In this case, for applications of which the user is aware, the user can control data communication by the applications. The user might not, however, be fully aware of what sort of applications are running on the communication apparatus. In particular, the user is highly likely not to be aware of applications running in the background on the system of the communication apparatus. Accordingly, in a case where the user would choose to prohibit data communication if aware of operations by an application, the user might not choose to prohibit data communication of the application due to not being aware of the operations. Regarding data communication performed by the system of a communication apparatus, it may also be the case that the user is given no choice as per the system specifications of the communication apparatus. In these cases, data communication not intended by the user may be performed, causing the amount of data communicated to increase without the user intending it to.

Therefore, it would be helpful to provide a communication apparatus, a DNS processing method, and a non-transitory computer-readable recording medium that can reduce the occurrence of communication not intended by the user.

The communication apparatus, DNS processing method, and non-transitory computer-readable recording medium according to embodiments of this disclosure can reduce the occurrence of communication not intended by the user.

Embodiment 1

The following describes a communication apparatus according to one of the embodiments in detail with reference to the drawings. The communication apparatus according to this embodiment may be a mobile device, such as a mobile phone or a smartphone. The communication apparatus according to this embodiment, however, is not limited to being a mobile device and may be any of a variety of electronic devices that perform data communication, such as a desktop PC, a notebook PC, a tablet PC, a household appliance, an industrial device (FA device), a dedicated terminal, or the like.

[Apparatus Structure]

Figure 1:
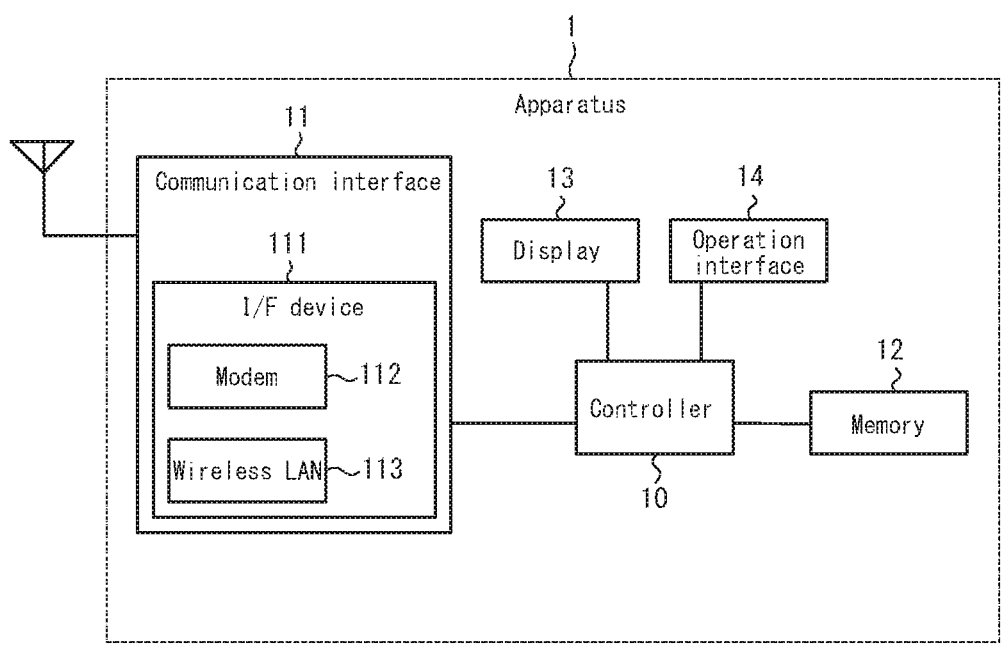
FIG. 1 is a functional block diagram schematically illustrating an example of the structure of a communication apparatus according to Embodiment 1.

FIG. 1 is a functional block diagram schematically illustrating an example of the structure of a communication apparatus 1 according to this embodiment. As illustrated in FIG. 1, the communication apparatus 1 includes a controller 10, a communication interface 11, a memory 12, a display 13, and an operation interface 14. The controller 10 is connected to and controls the communication interface 11, memory 12, display 13, and operation interface 14.

The controller 10 may be configured by a processor, microcomputer, or the like that can execute an operating system (OS) and application software (application). The OS may, for example, be Android (Android is a registered trademark in Japan, other countries, or both). The application is described below.

The communication interface 11 is a communication interface that performs cellular communication, wireless LAN communication, or the like and is provided with an interface (I/F) device 111. The I/F device 111 includes a modem 112 and a wireless LAN device 113. The communication interface 11 is connected to a network such as the Internet using the I/F device 111 and performs data communication with the network. As a result, the communication apparatus 1 can perform data communication with the network. The communication interface 11 is connected to the controller 10 and acquires data to be output to the network from the controller 10. The controller 10 selects data to output to the communication interface 11 based on filtering. The filtering is described below. The controller 10 also acquires data received from the network from the communication interface 11.

When connecting to the network with a cellular communication method, a pay-as-you-go fee structure is typically adopted, with the communication fee increasing as the amount of transmitted data (packets) increases. On the other hand, when connecting to the network with a method such as wireless LAN communication, such a fee structure is not typical.

The memory 12 may, for example, be configured by a semiconductor memory. A variety of information and data, along with programs for the OS, applications, and the like executed by the controller 10, are stored in the memory 12. The controller 10 executes programs stored in the memory 12. The controller 10 stores data generated by executing the programs in the memory 12. The memory 12 may also function as a working memory.

The display 13 displays characters, images, objects for operation, pointers, and the like based on information acquired from the controller 10. The display 13 may, for example, be a display device such as a liquid crystal display, an organic EL display, an inorganic EL display, or the like, but is not limited to these examples.

The operation interface 14 may be configured by physical keys such as numeric keys, a touchpad, a touch panel, or the like. In accordance with the content of input acquired from the operation interface 14, the controller 10 performs actions such as moving the pointer or the like displayed on the display 13 and selecting an object for operation.

Figure 2:
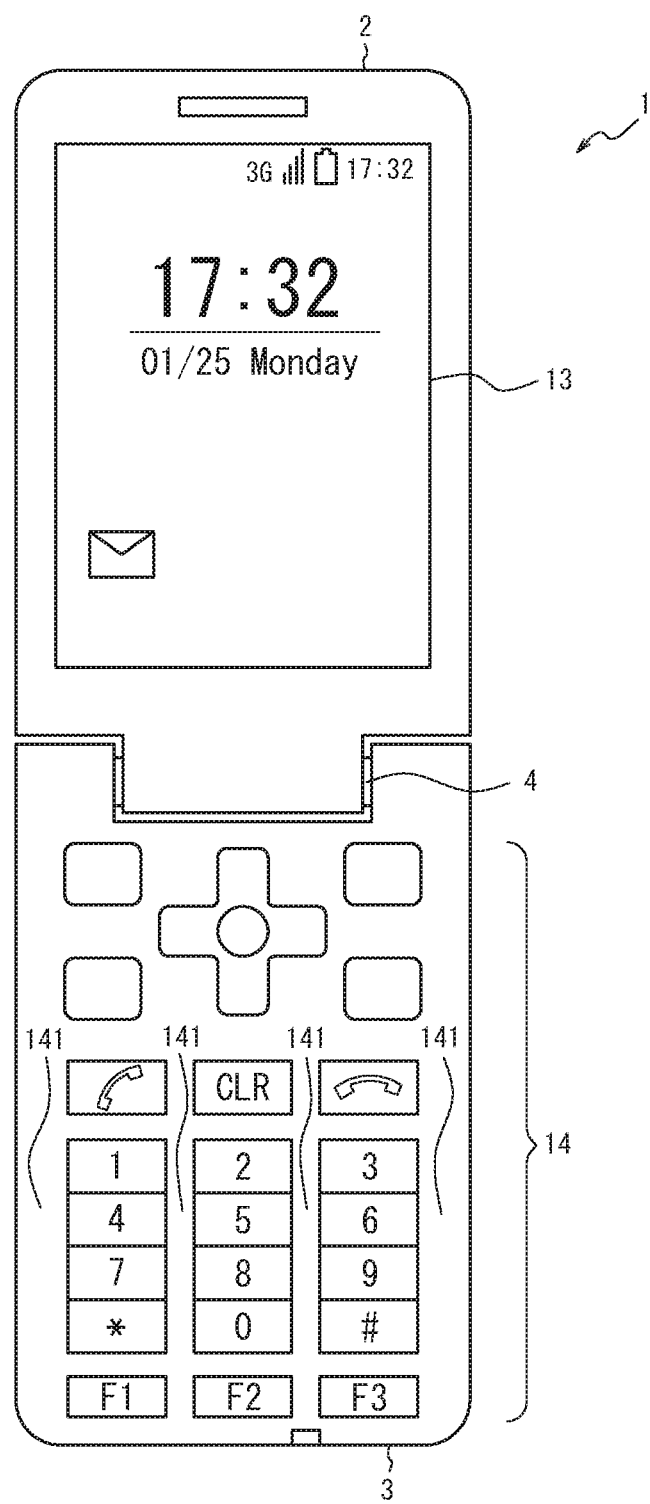
FIG. 2 is an external view of an example of the communication apparatus according to Embodiment 1.

FIG. 2 is an external view of an example of the communication apparatus 1 according to this embodiment. As illustrated in FIG. 2, the communication apparatus 1 according to this embodiment is a folding feature phone (flip phone, clamshell phone, or the like). In the communication apparatus 1, an upper housing 2 and a lower housing 3 are connected by a hinge 4 so as to be rotatable. The upper housing 2 is provided with the display 13, and the lower housing 3 is provided with the operation interface 14. The operation interface 14 is provided with physical keys, such as numeric keys, and with a touchpad 141 at a location where no physical key is provided. The communication apparatus 1 for example receives a selection operation on an object for operation using a physical key or receives a movement operation of a pointer or the like using the touchpad 141.

[Applications]

Applications are installed on the communication apparatus 1 and stored in the memory 12 so as to be executable by the controller 10. When the applications are installed on the communication apparatus 1, a unique user identifier (UID) is allocated to each application. Each application is executed by the controller 10 as a process associated with a UID on the OS.

When executed by the controller 10, an application accesses resources such as the file system. If each application were to access resources without restriction, the resource areas used by the applications would overlap, which might prevent the applications from executing properly. Therefore, access to resources is restricted by the UIDs associated with processes running on the OS, so that applications do not affect each other with their use of resources. In other words, the resources that can be accessed by each process are restricted to resources of the process associated with the same UID.

Each application may further be allocated a group identifier (GID or group ID). The GID identifies the group to which the unique UID allocated to each application belongs. One UID alone may belong to one group, or a plurality of UIDs may belong to one group. When an application is executed as a process associated with a UID, the process may also be associated with a GID. The restricted resources that can be accessed by each process may be broadened to include not only resources of the process associated with the same UID, but also resources of processes associated with the same GID.

Applications are executed in the foreground (FG) or the background (BG). A state in which an application is executed in the foreground is, for example, a state in which the execution status is displayed on the display 13 to allow user confirmation, or a state in which the user can perform operations with the operation interface 14. A state in which an application is executed in the background is, for example, a state in which the execution status is not displayed on the display 13 and the user cannot perform operations, or a state in which the application is running without intent by the user.

[Control of Data Communication]

The applications executed by the controller 10 perform data communication with a network, such as the Internet, using the communication interface 11. As described above, the applications are each executed as a process associated with a UID on the OS. The UID is associated with the data transmitted by the application. By determining whether to permit or prohibit (restrict) transmission of data based on the UID associated with the data, the controller 10 can control whether to permit or prohibit data communication for the data transmitted by each application. As a general rule, in the following explanation of this embodiment, data communication refers to data communication between the communication interface 11 and the network.

Figure 3:
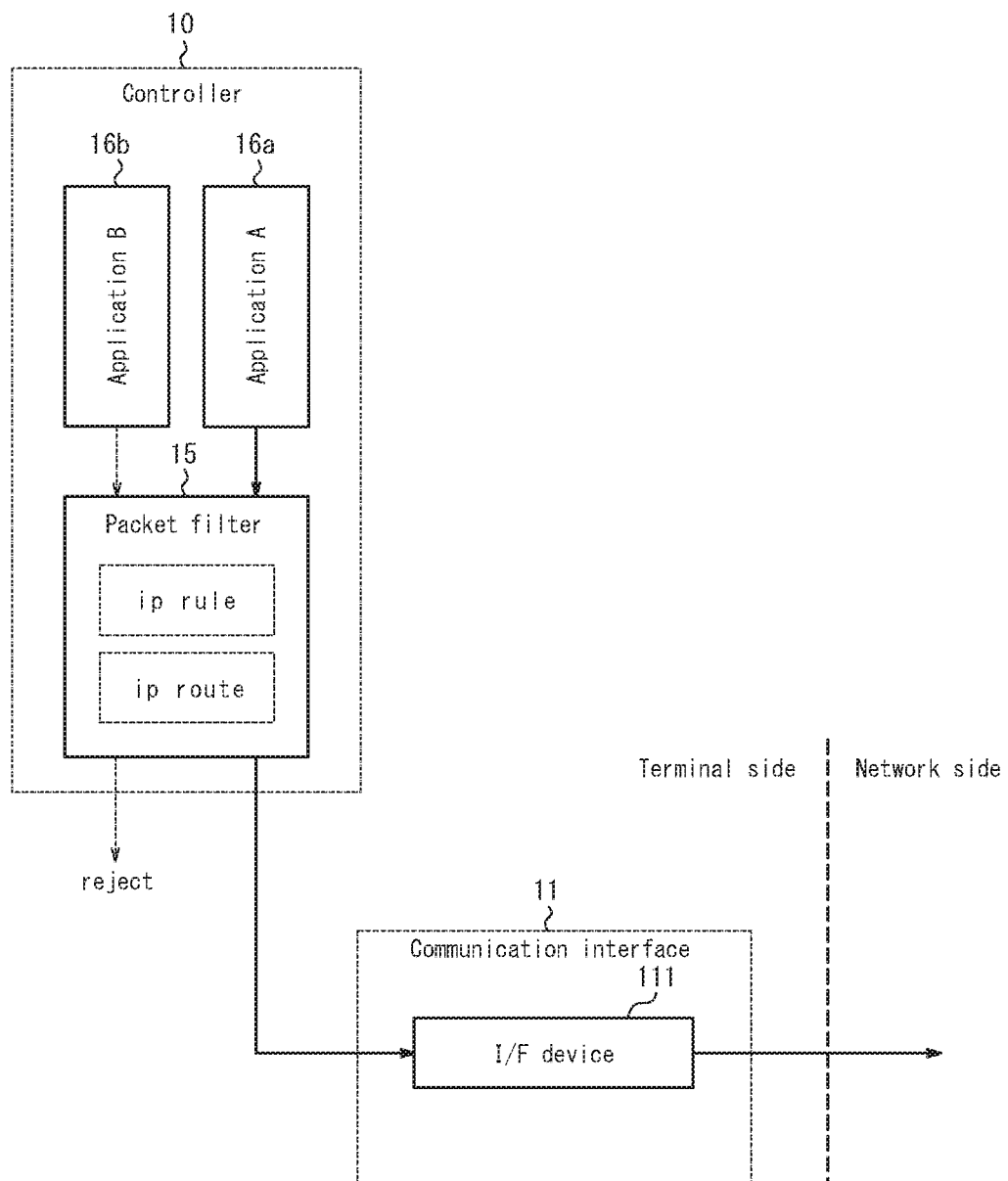
FIG. 3 is a block diagram illustrating an example of the flow of data according to Embodiment 1.

FIG. 3 is a block diagram illustrating an example of the flow of data according to this embodiment. In FIG. 3, the controller 10 and the communication interface 11 are provided on the terminal side. The communication interface 11 is connected to the network and performs data communication with the network.

In FIG. 3, the controller 10 executes an application A16a and an application B16b as processes on the OS. The applications executed by the controller 10 request data communication with the network as necessary. For example, the application A16a requests data transmission to the network. In this case, the data to transmit from the application A16a to the network are input into a packet filter 15 operating in the controller 10. Similarly, data to transmit from the application B16b to the network are input into the packet filter 15 from the application B16b.

The packet filter 15 filters data from the controller 10 to the network. The filtering is processing to determine whether to permit or prohibit transmission of data requested by an application based on set filtering conditions. The filtering conditions for example include an ip_rule or an ip_route. These filtering conditions are stored in the memory 12 and referred to by the packet filter 15. Hereinafter, operations to set the filtering conditions are assumed to include operations to store the filtering conditions in the memory 12. The filtering conditions may be held in the controller 10 without being stored in the memory 12.

The ip_rule for example includes a condition for determining whether to transmit data whose source is X to the network. The ip_route for example includes a condition for determining the route (relay router or the like) for transmitting data for which the destination is designated as Y to the network.

In FIG. 3, the flow of data transmitted from the application A16a is indicated by a solid arrow, whereas the flow of data transmitted from the application B16b is indicated by a dashed arrow. Of these two, the data transmitted from the application A16a are transmitted to the communication interface 11 without transmission being prohibited by the filtering in the packet filter 15. On the other hand, the data transmitted from the application B16b are prohibited by the filtering in the packet filter 15 and are not transmitted to the communication interface 11. This operation is indicated by the dashed arrow in FIG. 3 pointing towards the word "reject".

The data that pass through the packet filter 15 (in the case of FIG. 3, the data transmitted from the application A16a as indicated by the solid arrow) are input into the communication interface 11. The communication interface 11 transmits the data to the network using the I/F device 111. When transmitting the data to the network, the communication interface 11 may use cellular communication by the modem 112, wireless LAN communication by the wireless LAN device 113, or another communication method.

[Filtering]

It is determined whether to permit or prohibit data communication for data transmitted from an application based on the UID allocated to the application that is the source of data transmission. Hereinafter, data that are transmitted from an application to which X is allocated as the UID (application with a UID of X) are also referred to as data with a UID of X. The filtering condition used to filter data with a UID of X is also referred to as the filtering condition for data with a UID of X.

The packet filter 15 for example has a filtering condition that only allows data communication for data transmitted from an application with a UID of 1. The filtering condition may also be a combination of a plurality of conditions.

The following describes the sequence for data communication when filtering according to this embodiment is performed. The filtering according to this embodiment is assumed to determine whether to permit or prohibit data communication for data transmitted by an application running in the background. The following description of filtering according to this embodiment is based on this assumption.

The filtering according to this embodiment has a set filtering condition such that data communication is prohibited by default (default condition to prohibit communication). By the default condition to prohibit communication being set, all data communication is prohibited unless another filtering condition is further set. The default condition to prohibit communication may be set when the communication apparatus 1 is shipped or when the communication apparatus 1 is initialized. In other words, in this embodiment, the "default" refers to the standard operation that is set in advance at a predetermined time (for example, when the communication apparatus 1 is shipped, when the communication apparatus 1 is initialized, or the like).

In the filtering conditions used in this embodiment, in order to perform necessary data communication, a condition to permit data communication (condition to permit communication) is set in addition to the default condition to prohibit communication. In this case, the condition to permit communication takes priority over the default condition to prohibit communication.

Figure 4:
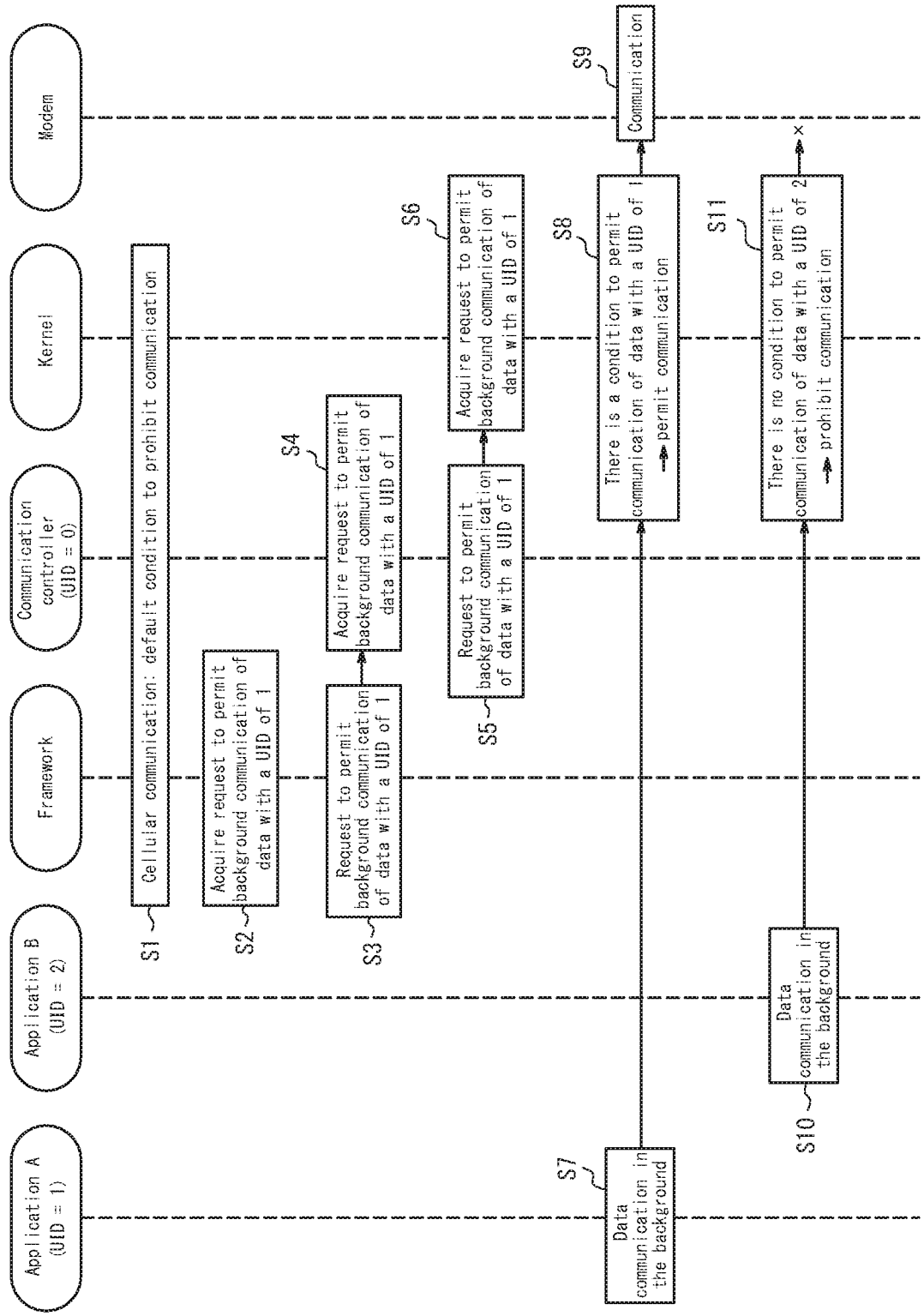
FIG. 4 illustrates the sequence of filtering according to Embodiment 1.

FIG. 4 illustrates the sequence of filtering according to this embodiment. FIG. 4 illustrates the sequence for the application A16a, application B16b, framework, communication controller, kernel, and modem 112.

As described above, the modem 112 is hardware that functions as a communication interface to perform cellular communication. In FIG. 4, data communication by cellular communication using the modem 112 is described, but the modem 112 may be replaced by another I/F device 111, such as the wireless LAN device 113, and data communication may be performed by another communication method.

The kernel, communication controller, and framework are software executed by the controller 10. In FIG. 4, the communication controller is allocated a UID of 0.

The framework is software that includes a functional group for causing applications to operate on the OS. In general, by combining portions of the functional group prepared on the framework, the functions of each application can be implemented.

The kernel is software that forms the nucleus of the OS. Based on processing of the applications and other software, the kernel manages processing on the communication interface 11 and other hardware to allow use of the hardware functions.

The communication controller is a daemon program that executes network related processing and executes processing that connects the framework and the kernel. In particular, the communication controller processes data to allow the kernel to use the functions of the communication interface 11. In this embodiment, the communication controller outputs, to the kernel, conditions for the kernel to determine whether to permit or prohibit data output to the communication interface 11.

In this embodiment, the filtering is described as being performed by the packet filter 15. The packet filter 15 is a virtual processing unit, and the actual filtering is performed by the communication controller and the kernel.

The application A16a and the application B16b are processes running on the OS. In FIG. 4, a UID of 1 is allocated to the application A16a, and a UID of 2 is allocated to the application B16b.

The following describes the sequence illustrated in FIG. 4. In the case of data transmission by an application running in the background, data communication by cellular communication is prohibited by default (step S1). In other words, as a filtering condition, a default condition to prohibit communication is set for data transmitted from an application running in the background. In FIG. 4, the kernel, communication controller, and framework recognize that the default condition to prohibit communication is set. In particular, when the kernel recognizes that the default condition to prohibit communication is set, data are not transmitted to the modem 112.

Next, the framework acquires a request to permit data communication for data with a UID of 1 in the case of an application running in the background (request to permit communication of data with a UID of 1) (step S2). The framework then outputs the request to permit communication of data with a UID of 1 to the communication controller (step S3).

The communication controller acquires the request to permit communication of data with a UID of 1 (step S4). Next, the communication controller outputs the request to permit communication of data with a UID of 1 to the kernel (step S5).

The kernel acquires the request to permit communication of data with a UID of 1 (step S6). With the above operations in steps S3 to S6, the request to permit communication of data with a UID of 1 is conveyed to the kernel. In other words, as a filtering condition, a condition to permit communication for data with a UID of 1 is set.

Next, when the application A16*a* issues a request for data communication while running in the background (step S7), the kernel permits the data communication, since the kernel recognizes that the condition to permit communication for data with a UID of 1 is set (step S8). The modem 112 then performs data communication to transmit the data with a UID of 1 to the network (step S9).

Conversely, when the application B16*b* allocated a UID of 2 requests data communication while running in the background (step S10), the kernel recognizes that a condition to permit communication for data with a UID of 2 is not set. Therefore, the kernel prohibits data communication based on the default condition to prohibit communication (step S11).

<Sequence of Data Transmission from an Application>

Figure 5:
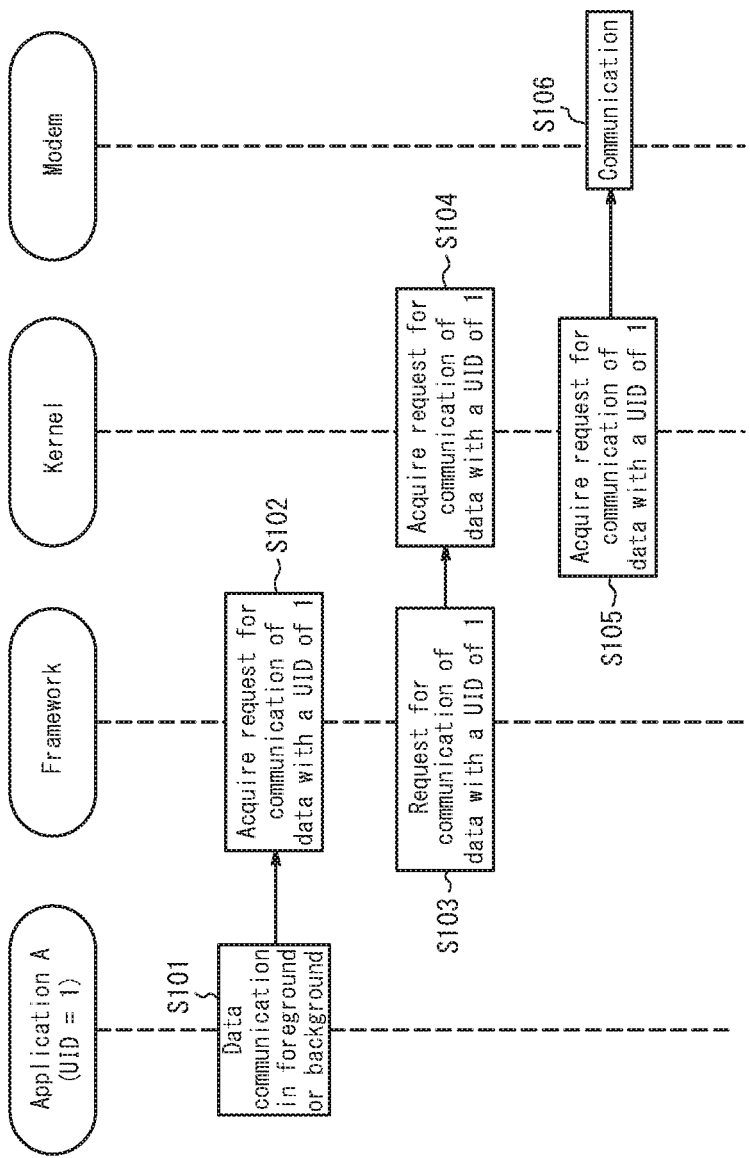
FIG. 5 illustrates an example of a sequence for transmitting data from an application.

In steps S7 to S9 of FIG. 4, the case of an application requesting data communication and the modem 112 performing data communication has been described. With reference to FIG. 5, the following describes this sequence in greater detail. FIG. 5 illustrates the sequence for the application A16*a*, framework, kernel, and modem 112. A description of the application A16*a*, framework, kernel, and modem 112 is the same as in FIG. 4 and is therefore omitted.

Whether running in the foreground or the background, the application A16*a* outputs a request, to the framework on the OS on which the application A16*a* is running, for data communication of data (data with a UID of 1) transmitted from the application A16*a* (request for communication of data with a UID of 1) (step S101).

The framework acquires the request for communication of data with a UID of 1 (step S102). Next, the framework outputs the request for communication of data with a UID of 1 to the kernel (step S103).

The kernel acquires the request for communication of data with a UID of 1 (step S104). Next, the kernel outputs data based on the request for communication of data with a UID of 1 to the modem 112 (step S105). The modem 112 then performs data communication to transmit the data with a UID of 1 to the network (step S106).

With the operations of the sequence illustrated in FIG. 5 as described above, data transmitted from the application are output to the communication interface 11 and are transmitted to the network.

Comparative Example

With the filtering according to the embodiment described thus far, in addition to the default condition to prohibit communication, a condition to permit communication is explicitly added by the user. Therefore, data communication not intended by the user is more likely to be prohibited. The following describes filtering according to a Comparative Example of this embodiment. The filtering conditions used in the filtering according to the Comparative Example include a condition to permit data communication for all data by default (default condition to permit communication). In addition to permitting data communication for all data in this way, a condition to prohibit data communication for data with a UID designated by the user (condition to prohibit communication) is further set.

Figure 6:
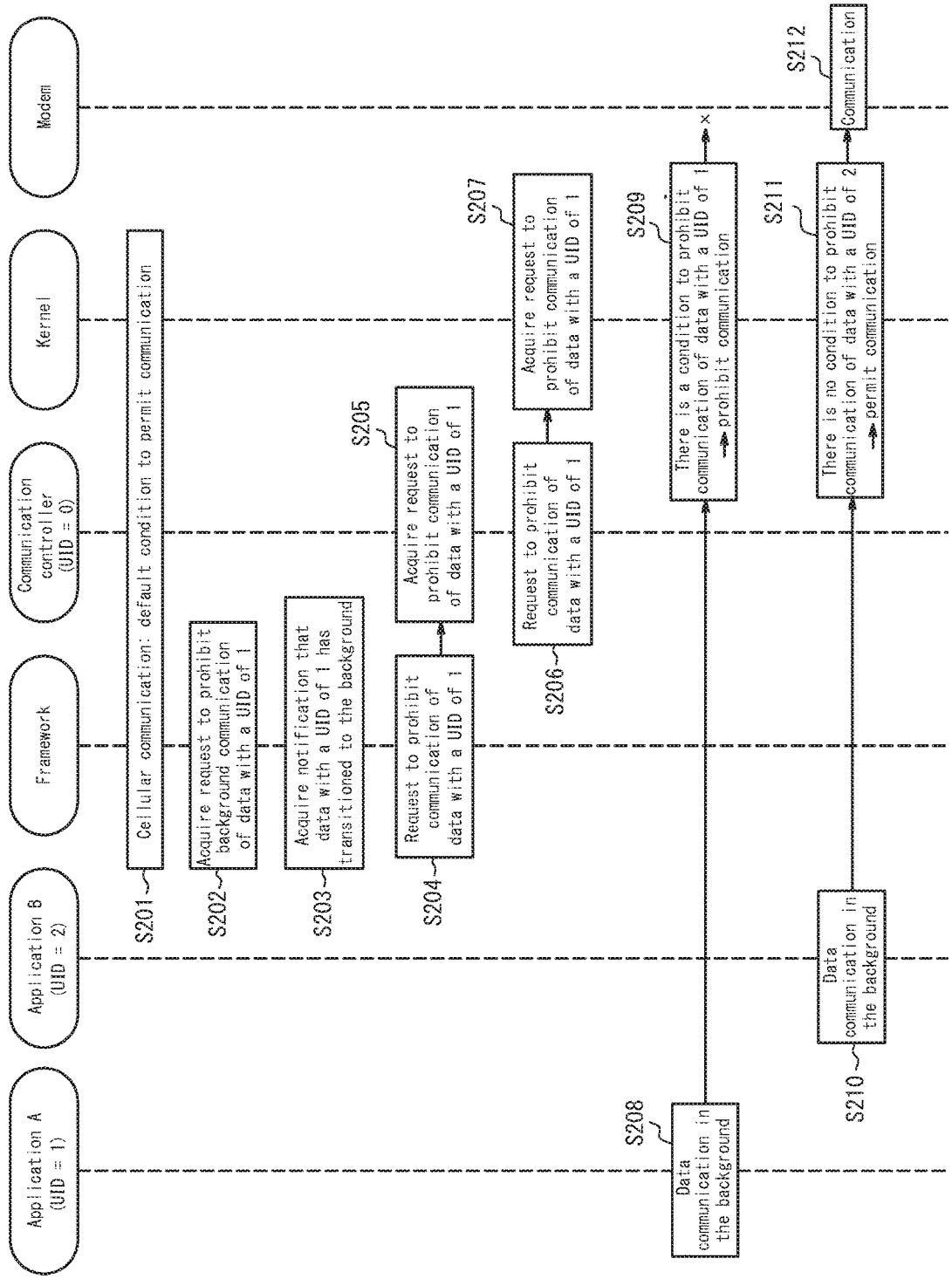
FIG. 6 illustrates the sequence of filtering according to a Comparative Example of Embodiment 1.

FIG. 6 illustrates the sequence of filtering according to a Comparative Example. A description of the application A16*a*, application B16*b*, framework, communication controller, kernel, and modem 112 is the same as in FIG. 4 and FIG. 5 and is therefore omitted.

In FIG. 6, even when an application running in the background transmits data, data communication by cellular communication is permitted by default (step S201). In other words, as a filtering condition, a default condition to permit communication is set for data transmitted from an application running in the background.

Next, the framework acquires a request to prohibit data communication for data with a UID of 1 in the case of the application A16*a* running in the background (request to prohibit communication of data with a UID of 1) (step S202). At this point in time, the application A16*a* is not running in the background, and therefore the condition to prohibit communication for data with a UID of 1 is not set.

Next, the framework acquires notification that the application A16*a* has transitioned to running in the background (background transition notification) (step S203). After receiving the notification, the framework outputs the request to prohibit communication of data with a UID of 1 to the communication controller (step S204).

The communication controller acquires the request to prohibit communication of data with a UID of 1 (step S205). Next, the communication controller outputs the request to prohibit communication of data with a UID of 1 to the kernel (step S206).

The kernel acquires the request to prohibit communication of data with a UID of 1 (step S207). With the above operations in steps S202 to S207, the request to prohibit communication of data with a UID of 1 is conveyed to the kernel. In other words, as a filtering condition, a condition to prohibit communication for data with a UID of 1 is set.

Next, when the application A16*a* issues a request for data communication while running in the background (step S208), the kernel prohibits the data communication, since the kernel recognizes that the condition to prohibit communication for data with a UID of 1 is set (step S209).

Conversely, when the application B16*b* allocated a UID of 2 requests data communication while running in the background (step S210), the kernel recognizes that a condition to prohibit communication for data with a UID of 2 is not set. Accordingly, based on the default condition to permit communication, the kernel permits data communication (step S211). The modem 112 then performs data communication to transmit the data with a UID of 2 to the network (step S212).

Filtering according to a Comparative Example has been described above. In the Comparative Example, the default condition to permit communication is set. Therefore, data communication is permitted for background operation of the application B16*b*, for which the user has not explicitly set an additional filtering condition. Accordingly, when the user is not aware of the operations of the application B16b, data communication not intended by the user may be performed.

Conversely, in this embodiment, the default condition to prohibit communication is set as a filtering condition. On top of this default condition, a condition to permit communication for data with a UID designated by the user is further set. In this case, by prohibiting data communication for all data by default, data communication not intended by the user is more likely to be prohibited.

Filtering according to this embodiment and a Comparative Example has been described above. In the filtering according to this embodiment, data communication is prohibited for all data by default, unlike the filtering according to the Comparative Example. A condition to permit communication for data with a UID designated by the user is then explicitly set by the user as a filtering condition, thereby allowing data communication intended by the user.

With the filtering according to this embodiment having the above-described configuration, data communication for data transmitted from the application B16b, for which a filtering condition has not been explicitly set by the user, can be prohibited. In other words, the probability of prohibiting data communication not intended by the user increases.

In this embodiment, a method for prohibiting data communication via a cellular communication method using the modem 112 as the I/F device 111 has mainly been described. The I/F device 111 is not limited to the modem 112, however, and may be the wireless LAN device 113 or the like. In other words, the control method for data communication of the communication apparatus 1 according to this embodiment is not limited to data communication with a cellular communication method and may also be applied to data communication with another communication method, such as a wireless LAN communication method.

In this embodiment, data communication may be permitted by default for functions that are necessary to transmit the data for which data communication is permitted. The functions for which data communication is permitted by default may, for example, be a tunneling function of a Virtual Private Network (VPN), a name resolving function of a Domain Name System (DNS), or a tethering function. Permission for data communication related to these functions may be restricted to operations intended by the user. The condition for permitting data communication for these functions may be set as a filtering condition that takes priority over the default condition to prohibit communication.

The filtering according to this embodiment is performed for data communication of an application running in the background, but filtering is not limited to this case and may be performed for data communication of an application running in the foreground. In other words, the filtering according to this embodiment may determine whether to permit or prohibit data communication for data transmitted by an application running in the foreground.

Embodiment 2

The following describes a communication apparatus according to Embodiment 2. In Embodiment 1, a configuration to control data communication based on the ID of an application and on filtering conditions was described. The communication apparatus according to Embodiment 2 differs from Embodiment 1 by performing Domain Name System (DNS) processing based on the ID of an application and on filtering conditions.

As in Embodiment 1, the communication apparatus 1 according to Embodiment 2 includes the controller 10, communication interface 11, memory 12, display 13, and operation interface 14 (see FIG. 1). In the following description, where the structure is the same as in Embodiment 1, the same reference signs are applied, and a description thereof is omitted.

First, an outline of typical DNS processing (name resolution) is provided. For example, when a communication device, such as a smartphone on which an OS from a provider (standard OS) is installed, performs data communication in response to a connection request from an application to connect to the network (for example, a request for data communication), the communication device first executes DNS processing based on the connection request. In greater detail, upon acquiring the connection request from the application to the network, the communication device transmits data for the DNS processing, specifically a packet that includes the domain pertaining to the request from the application (DNS request packet), for example to an external DNS server. Next, the communication device acquires response data from the DNS server, specifically a packet that includes the IP address corresponding to the domain pertaining to the request from the application (DNS response packet). Once the DNS processing is completed in this way, the communication device performs data communication based on the acquired IP address. Hereinafter, the communication between the communication device and the DNS server during DNS processing is referred to as DNS data communication, which is distinguished from data communication between the communication device and the network after execution of the DNS processing.

<DNS Processing According to Embodiment 2>

Figure 7:
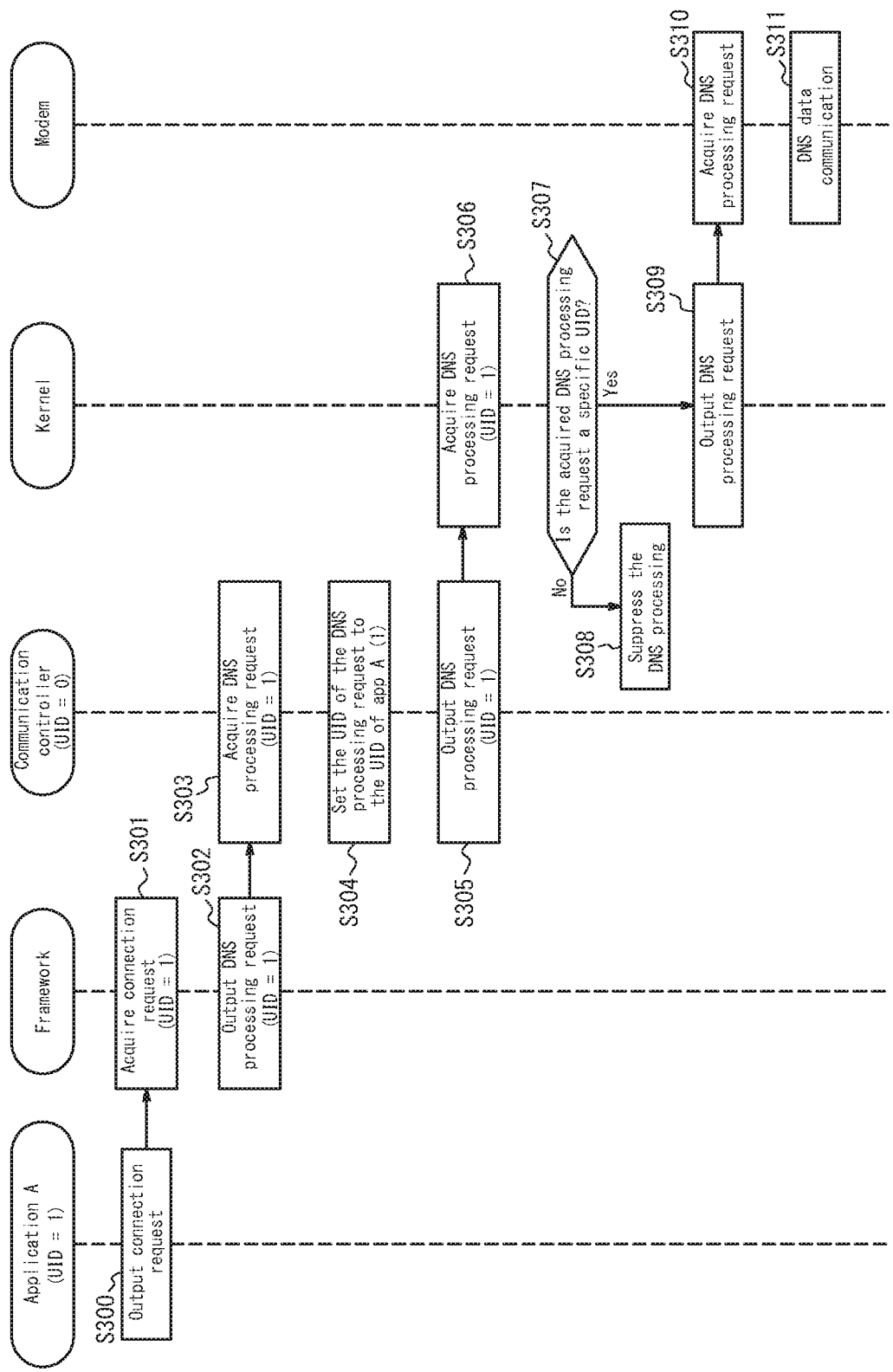
FIG. 7 illustrates the sequence of DNS processing according to Embodiment 2.

Next, with reference to FIG. 7, DNS processing executed in the communication apparatus 1 according to this embodiment is described in detail. Here, the OS installed on the communication apparatus 1 of this embodiment (modified OS) is an OS in which specific code for controlling DNS processing (specific code) has been added to the communication controller and to the kernel that are included in the OS according to Embodiment 1 above. Alternatively, the modified OS may be an OS in which the code for a portion of the communication controller and the code for a portion of the kernel included in the OS according to Embodiment 1 are modified to be specific code. The modified OS may also be an OS yielded by adding the above-described specific code to, or modifying the code of, the standard OS.

In the example illustrated below, data communication by cellular communication is prohibited for every application (all UIDs and GIDs) by default, regardless of whether the application is running in the foreground or the background, and IDs (specific IDs) for which data communication is permitted by exception are additionally set individually. For example, all UIDs necessary for DNS processing, including the UID of the communication controller (UID=0), are set in advance as specific IDs, but other UIDs may be additionally set as specific IDs. For example, as in Embodiment 1, the UID of an application identified based on user input to the communication apparatus 1 may be additionally set as a specific ID.

First, the application A (UID=1) outputs, to the framework, a connection request to connect to the network (step S300). For example, the UID (UID=1) of the application A and the domain that is the destination of data communication are included in the connection request.

Next, once the framework acquires the connection request output from the application A in step S300 (step S301), the framework outputs a DNS processing request to the communication controller (step S302). The UID of the DNS processing request output from the framework to the communication controller is the same as the UID of the application A (UID=0).

Next, the communication controller acquires the DNS processing request (UID=1) output from the framework in step S302 (step S303). Upon acquiring the DNS processing request, the communication controller sets the UID of a DNS processing request for output to the kernel to the UID of the communication controller (UID=0). Subsequently, the specific code (first specific code) added to the communication controller as described above is executed.

By executing the first specific code, the communication controller changes the UID of the DNS processing request for output to the kernel from the UID of the communication controller (UID=0) to the UID of the application (UID=1) (step S304). In other words, by executing the first specific code added to the communication controller, the UID of the DNS processing request for output to the kernel is set not to the UID of the communication controller (UID=0), but rather to the UID of the application A (UID=1). The communication controller then outputs, to the kernel, the DNS processing request (UID=1) for which the UID was changed (determined) by execution of the first specific code (step S305).

Next, the kernel acquires the DNS processing request (UID=1) output from the communication controller in step S305 (step S306). Subsequently, the specific code (second specific code) added to the kernel as described above is executed.

By execution of the second specific code, the kernel performs the following operations. First, the kernel determines whether the UID of the DNS processing request (UID=1) acquired from the communication controller is a specific ID (step S307). When determining that the UID is not a specific ID (step S307: No), the kernel suppresses (terminates) the DNS processing (step S308) and for example returns an error. On the other hand, when determining that the UID is a specific ID (step S307: Yes), the kernel outputs the DNS processing request to the modem 112 (step S309).

Then, once the modem 112 acquires the DNS processing request output from the kernel in step S309 (step S310), the modem 112 performs DNS data communication (step S311). In greater detail, the modem 112 outputs a DNS request packet to the DNS server and acquires a DNS response packet from the DNS server. Once DNS processing (name resolution) is thus complete, the communication apparatus 1 starts data communication in accordance with the request from the application.

In this way, with the communication apparatus 1 according to Embodiment 2, DNS data communication (and data communication) is permitted for an application that matches a specific ID. On the other hand, DNS processing is suppressed for an application that does not match a specific ID. By the DNS processing being suppressed, DNS data communication does not occur (nor does data communication). Therefore, for example as compared to Embodiment 1 above, communication not intended by the user can be further reduced by an amount corresponding to the DNS data communication that does not occur. Furthermore, for an application that does not match a specific ID, a DNS processing request is not output from the kernel to the modem 112. Therefore, for example when the modem 112 is in a dormant state, consumption of the power necessary to activate the modem 112 can be suppressed.

<DNS Processing According to a Comparative Example>

Figure 8:
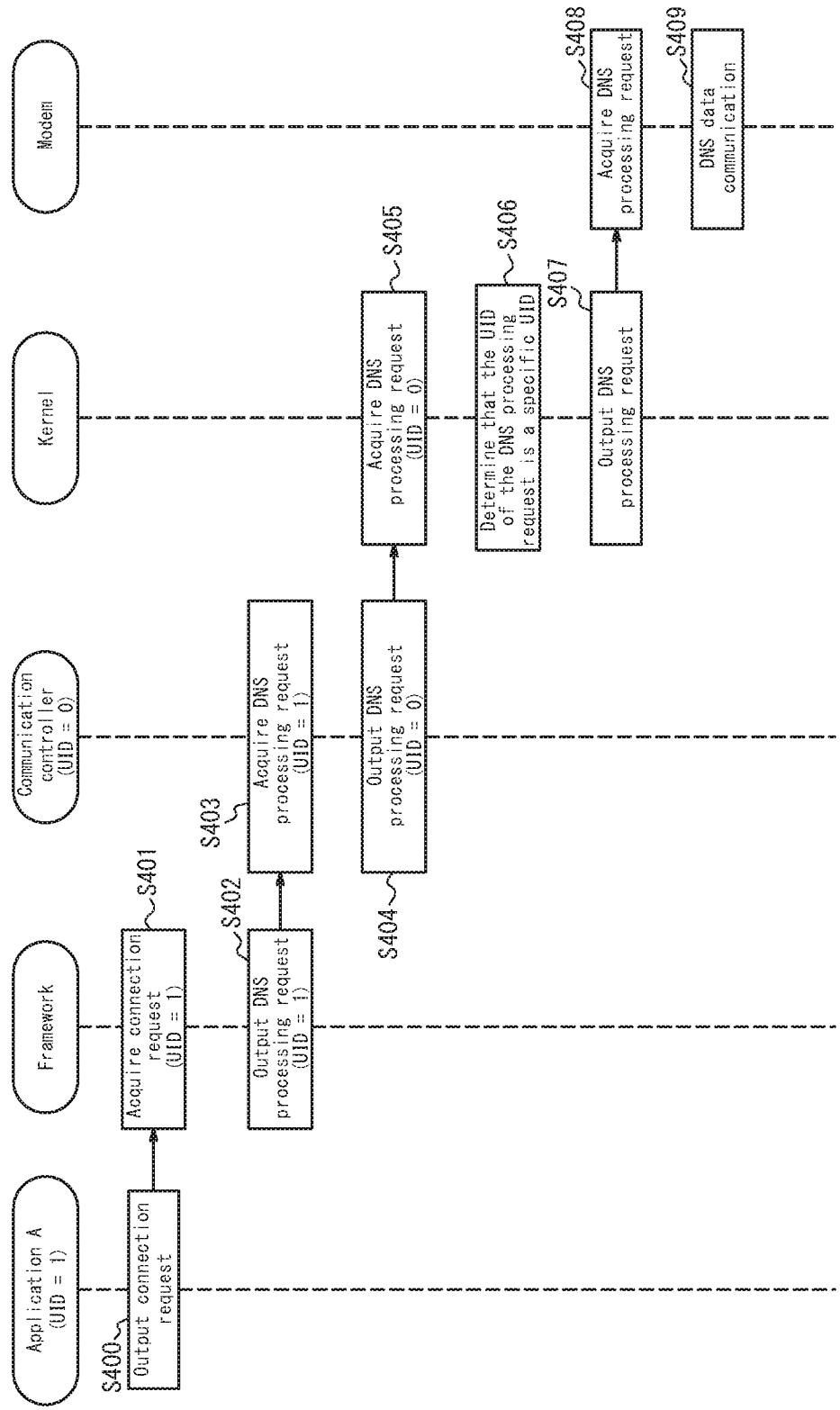
FIG. 8 illustrates the sequence of DNS processing according to a Comparative Example of Embodiment 2.

Next, with reference to FIG. 8, the following describes DNS processing according to a Comparative Example of Embodiment 2. During the DNS processing executed by the communication apparatus 1 according to the Comparative Example, execution of the first specific code is suppressed in the above-described modified OS.

First, the application A (UID=1) outputs, to the framework, a connection request to connect to the network (step S400). For example, the UID (UID=1) of the application A and the domain that is the destination of data communication are included in the connection request.

Next, once the framework acquires the connection request output from the application A in step S400 (step S401), the framework outputs a DNS processing request to the communication controller (step S402). The UID of the DNS processing request output from the framework to the communication controller is the same as the UID of the application A (UID=0).

Next, the communication controller acquires the DNS processing request (UID=1) output from the framework in step S402 (step S403). Upon acquiring the DNS processing request, the communication controller sets the UID of a DNS processing request for output to the kernel to the UID of the communication controller (UID=0).

The above-described step S400 to step S403 are the same as step S300 to step S303 in the DNS processing according to Embodiment 2.

Subsequently, without the first specific code being executed, i.e. without the UID of the DNS processing request for output to the kernel being changed, the communication controller outputs the DNS processing request (UID=0) to the kernel (step S404).

Next, the kernel acquires the DNS processing request (UID=0) output from the communication controller in step S404 (step S405). Subsequently, the specific code (second specific code) added to the kernel as described above is executed. Here, the communication controller determines that the UID of the acquired DNS processing request (UID=0) is a specific ID (step S406). The kernel then outputs the DNS processing request to the modem 112 (step S407).

Then, once the modem 112 acquires the DNS processing request output from the kernel in step S407 (step S408), the modem 112 performs DNS data communication (step S409).

In this way, during the DNS processing according to the Comparative Example, since the above-described first specific code is not executed, DNS data communication ends up occurring even for a request from an application for which data communication should be prohibited. In other words, in the Comparative Example, the UID of the DNS processing request output from the communication controller to the kernel is the same as the UID of the communication controller (UID=0). Therefore, the kernel cannot identify the UID of the application based on the DNS processing request acquired from the communication controller and cannot execute DNS processing control in accordance with the UID of the application.

With the communication apparatus 1 according to the Comparative Example, however, even though DNS data communication ends up occurring as described above in response to a request from an application for which data communication is prohibited, data communication after completion of the DNS processing is prohibited as in Embodiment 1. Accordingly, as in Embodiment 1, the occurrence of communication not intended by the user can be reduced.

As described above, upon acquiring a connection request from an application to connect to the network, the communication apparatus 1 according to Embodiment 2 controls DNS processing based on the connection request in accordance with the ID (for example, UID) of the application. For example with respect to a request from an application for which data communication is prohibited, this configuration allows not only data communication but also DNS data communication to be prohibited. Accordingly, with respect to a request from an application for which data communication is prohibited, neither data communication nor DNS data communication occurs, thereby further reducing the occurrence of data communication not intended by the user as compared to Embodiment 1. Furthermore, with respect to an application for which data communication is prohibited, the kernel suppresses DNS processing by executing the second specific code. Hence, no DNS processing request is output from the kernel to the modem 112. Therefore, for example when the modem 112 is in a dormant state (hibernation), consumption of the power necessary for the modem 112 to return from the dormant state can be suppressed.

Embodiment 3

The following describes a communication apparatus 1 according to Embodiment 3. In Embodiment 2 above, a configuration to control DNS processing by executing specific code added to the communication controller and to the kernel was described. The communication apparatus 1 according to Embodiment 3 differs from Embodiment 2 by controlling DNS processing through execution of specific code added to the framework.

As in Embodiment 1 and Embodiment 2, the communication apparatus 1 according to Embodiment 3 includes the controller 10, communication interface 11, memory 12, display 13, and operation interface 14 (see FIG. 1). In the following description, where the structure is the same as in Embodiment 1 and Embodiment 2, the same reference signs are applied, and a description thereof is omitted.

<DNS Processing According to Embodiment 3>

With reference to FIG. 9, DNS processing executed in the communication apparatus 1 according to this embodiment is described in detail. Here, the OS installed on the communication apparatus 1 of this embodiment (modified OS) is an OS in which specific code for controlling DNS processing (third specific code) has been added to the framework included in the OS according to Embodiment 1 above. Alternatively, the modified OS may be an OS in which the code for a portion of the framework included in the OS according to Embodiment 1 is modified to be the third specific code. The modified OS may also be an OS yielded by adding the aforementioned third specific code to, or modifying the code of, the standard OS.

In the example illustrated below, data communication by cellular communication is prohibited for every application (all UIDs and GIDs) by default, regardless of whether the application is running in the foreground or the background, and IDs (specific IDs) for which data communication is permitted by exception are additionally set individually. For example, the UID of the communication controller (UID=0) is set in advance as a specific ID, but other UIDs may be additionally set as specific IDs. For example, the UID of an application identified based on user input to the communication apparatus 1 may be additionally set as a specific ID.

First, the application A (UID=1) outputs, to the framework, a connection request to connect to the network (step S500). For example, the UID (UID=1) of the application A and the domain that is the destination of data communication are included in the connection request.

Next, the framework acquires the connection request from the application A in step S500 (step S501). Subsequently, the third specific code added to the framework as described above is executed.

By executing the third specific code, the framework determines whether the UID of the connection request acquired from the application A is a specific ID (step S502). When determining that the UID is not a specific ID (step S502: No), the framework suppresses (ends) the DNS processing (step S503) and for example returns an error. On the other hand, when determining that the UID is a specific ID (step S502: Yes), the framework outputs the DNS processing request (UID=1) to the modem 112 (step S504).

Once the DNS processing request (UID=1) is output from the framework in step S504, the communication controller acquires the DNS processing request (step S505). Upon acquiring the DNS processing request, the communication controller sets the UID of a DNS processing request for output to the kernel to the UID of the communication controller (UID=0). Subsequently, the communication controller outputs the DNS processing request (UID=0) to the kernel (step S506).

Next, once the kernel acquires the DNS processing request (UID=0) output from the communication controller in step S506 (step S507), the kernel outputs the DNS processing request to the modem 112 (step S508).

Then, once the modem 112 acquires the DNS processing request output from the kernel in step S508 (step S509), the modem 112 performs DNS data communication (step S510).

In this way, with the communication apparatus 1 according to Embodiment 3, DNS data communication (and data communication) is permitted for an application that matches a specific ID. On the other hand, DNS processing is suppressed for an application that does not match a specific ID. By the DNS processing being suppressed, DNS data communication and data communication do not occur. Therefore, as in Embodiment 2 above, communication not intended by the user can be further reduced. Furthermore, for an application that does not match a specific ID, a DNS processing request is not output from the kernel to the modem 112. Therefore, as in Embodiment 2, for example when the modem 112 is in a dormant state, consumption of the power necessary to activate the modem 112 can be suppressed.

Although exemplary embodiments have been described with reference to the accompanying drawings, it is to be noted that various changes and modifications will be apparent to those skilled in the art based on this disclosure. Therefore, such changes and modifications are to be understood as included within the scope of this disclosure. For example, the functions and the like included in the various components and steps may be reordered in any logically consistent way. Furthermore, components or steps may be combined into one or divided. While this disclosure has been described focusing on apparatuses, this disclosure may also be embodied as a method that includes steps performed by the components of an apparatus. Furthermore, while this disclosure has been described focusing on apparatuses, this disclosure may also be embodied as a method or program executed by a processor provided in an apparatus, or as a non-transitory computer-readable recording medium on which a program is recorded. Such embodiments are also to be understood as included in the scope of this disclosure.

For example, in the above-described embodiment, a configuration in which DNS processing is controlled based on the UID has been described, but control is not limited to the UID. A configuration may be adopted in which, for example, DNS processing is controlled based on the GID.

In Embodiment 2 and Embodiment 3, data communication by cellular communication is prohibited for every application (all UIDs and GIDs) by default, regardless of whether the application is running in the foreground or the background, and IDs (specific IDs) for which data communication is permitted by exception are additionally set individually. A configuration for prohibiting data communication of an application using UIDs or GIDs, however, is not limited to this case. For example, a configuration may be adopted in which data communication by cellular communication of all applications is permitted by default, with individual IDs for which data communication is prohibited by exception being additionally set. As another example, cellular communication by applications may be prohibited or permitted as described above only in the case of applications running in the foreground (or the background). In greater detail, cellular communication by all applications running in the background (or the foreground) may be prohibited (or permitted) by default.

In Embodiment 3 above, a configuration in which the third specific code is added to the framework has been described, but specific code (fourth specific code) may be added to the communication controller instead. In this configuration, the communication controller acquires a DNS processing request (UID=n) output from the framework in accordance with a connection request from an application (UID=n). Subsequently, the fourth specific code is executed. By execution of the fourth specific code, the communication controller determines whether the UID of the acquired DNS processing request is a specific ID. The communication controller then suppresses DNS processing when determining that the UID is not a specific ID and outputs the DNS processing request to the kernel when determining that the UID is a specific ID. With this configuration as well, as in Embodiment 3, the occurrence of communication not intended by the user can be further reduced. Also, as in Embodiment 3, when the modem 112 is in a dormant state, consumption of the power necessary to activate the modem 112 can be suppressed.

In the above embodiments, wireless LAN has been provided as an example of a data communication method that is not a pay-as-you-go method, but this example is not limiting. Other data communication methods that are not pay-as-you-go methods include Bluetooth® and Ethernet® (Bluetooth and Ethernet are registered trademarks in Japan, other countries, or both).

The invention claimed is:

1. A mobile device capable of data communication, comprising:
   a memory; and
   a controller communicatively coupled with the memory and configured to, upon acquiring a connection request from an application running on an OS of the mobile device to connect to a network, control DNS processing based on the connection request in accordance with an ID of the application issuing the connection request,
   wherein the controller
      determines whether the ID of the application is a specific ID;
      permits the DNS processing when determining that the ID of the application is the specific ID; and
      prohibits the DNS processing when determining that the ID of the application is not the specific ID,
   wherein by executing code added to an OS of the mobile device, the controller determines whether the ID of the application is the specific ID, and
   wherein
   upon acquiring the connection request from the application,
      a communication controller included in the OS acquires a DNS processing request having an ID;
      by executing code added to the communication controller included in the OS, the controller sets the ID of the DNS processing request to the ID of the application and outputs the DNS processing request to a kernel included in the OS; and
      by executing code added to the kernel, the controller determines, based on the DNS processing request, whether the ID of the application is the specific ID.

2. The mobile device of claim 1, wherein the controller identifies an ID based on user input to the mobile device and sets the ID identified based on user input to be the specific ID.

3. A communication apparatus capable of data communication, comprising:
   a memory; and
   a controller communicatively coupled with the memory and configured to, upon acquiring a connection request from an application to connect to a network, control DNS processing based on the connection request in accordance with an ID of the application issuing the connection request,
   wherein the controller
      determines whether the ID of the application is a specific ID;
      permits the DNS processing when determining that the ID of the application is the specific ID; and
      prohibits the DNS processing when determining that the ID of the application is not the specific ID,
   wherein by executing code added to an OS of the communication apparatus, the controller determines whether the ID of the application is the specific ID, and
   wherein
   upon acquiring the connection request from the application,
      a communication controller included in the OS acquires a DNS processing request having an ID;
      by executing code added to the communication controller included in the OS, the controller sets the ID of the DNS processing request to the ID of the application and outputs the DNS processing request to a kernel included in the OS; and
      by executing code added to the kernel, the controller determines, based on the DNS processing request, whether the ID of the application is the specific ID.

4. A DNS processing method performed by a mobile device capable of data communication, the DNS processing method comprising:
   upon acquiring a connection request from an application running on an OS of the mobile device to connect to a network, controlling DNS processing based on the connection request in accordance with an ID of the application issuing the connection request,
   wherein the DNS processing method further comprises:
      determining whether the ID of the application is a specific ID;
      permitting the DNS processing when determining that the ID of the application is the specific ID; and
      prohibiting the DNS processing when determining that the ID of the application is not the specific ID, wherein the DNS processing method further comprises:
by executing code added to the OS of the mobile device, determining whether the ID of the application is the specific ID, and wherein the DNS processing method further comprises:
upon acquiring the connection request from the application,
acquiring a DNS processing request having an ID by a communication controller included in the OS;
by executing code added to the communication controller included in the OS, setting the ID of the DNS processing request to the ID of the application and outputting the DNS processing request to a kernel included in the OS; and
by executing code added to the kernel, determining, based on the DNS processing request, whether the ID of the application is the specific ID.

* * * * *